US011579426B2

(12) United States Patent
Chiu et al.

(10) Patent No.: US 11,579,426 B2
(45) Date of Patent: Feb. 14, 2023

(54) DUAL COLLIMATING LENS CONFIGURATION FOR OPTICAL DEVICES

(71) Applicant: Intel Corporation, Santa Clara, CA (US)

(72) Inventors: Chia-Pin Chiu, Tempe, AZ (US); Anna M. Prakash, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 16/643,158

(22) PCT Filed: Sep. 28, 2017

(86) PCT No.: PCT/US2017/053857
§ 371 (c)(1),
(2) Date: Feb. 28, 2020

(87) PCT Pub. No.: WO2019/066831
PCT Pub. Date: Apr. 4, 2019

(65) Prior Publication Data
US 2020/0348498 A1    Nov. 5, 2020

(51) Int. Cl.
*G02B 19/00* (2006.01)
*G02B 27/30* (2006.01)

(52) U.S. Cl.
CPC ......... *G02B 19/0076* (2013.01); *G02B 27/30* (2013.01)

(58) Field of Classification Search
CPC ............ G02B 19/0014; G02B 19/0076; G02B 27/30; G02B 6/4215
See application file for complete search history.

(56) References Cited

U.S. PATENT DOCUMENTS

| 6,256,436 B1 | 7/2001 | Nakama |
| 2005/0276537 A1 | 12/2005 | Frisken |
| 2006/0159405 A1* | 7/2006 | Yajima ................. G02B 6/4206 385/88 |
| 2008/0166136 A1* | 7/2008 | Birincioglu .......... G02B 6/4214 398/212 |

(Continued)

FOREIGN PATENT DOCUMENTS

WO    2019066831 A1    4/2019

OTHER PUBLICATIONS

"Optical Demultiplexers," Chapter 5; Part II Optical Components; pp. 91-96.

(Continued)

*Primary Examiner* — Joseph P Martinez
*Assistant Examiner* — Vipin Patel
(74) *Attorney, Agent, or Firm* — Akona IP PC (57) ABSTRACT

Aspects of the embodiments are directed to an opto-electronic device and methods of using the same. The opto-electronic device can include a processing device and a photonic device. The photonic device can include an optical demultiplexer; a collimating lens optically coupled to the optical demultiplexer and positioned to receive light from the optical demultiplexer, the collimating lens to collimate light received from the optical demultiplexer; a photodetector comprising a photosensitive element, the photosensitive element to convert received light into an electrical signal; and a focusing lens optically coupled to the photodetector, the focusing lens to receive light and focus the light towards the photosensitive element.

19 Claims, 8 Drawing Sheets

(56) References Cited

U.S. PATENT DOCUMENTS

| | | | |
|---|---|---|---|
| 2008/0174845 A1* | 7/2008 | Shikii | G02B 26/123 |
| | | | 359/226.1 |
| 2011/0058771 A1* | 3/2011 | Lee | G02B 6/4215 |
| | | | 385/33 |
| 2011/0097037 A1* | 4/2011 | Kuznia | G02B 6/4246 |
| | | | 264/1.24 |
| 2012/0189314 A1 | 7/2012 | Xu et al. | |
| 2014/0263970 A1 | 9/2014 | Heimbuch et al. | |
| 2016/0047989 A1 | 2/2016 | Hallstein et al. | |
| 2016/0141831 A1 | 5/2016 | Li et al. | |

OTHER PUBLICATIONS

Shimura, D., et al., "Hybrid Integration Technology of Silicon Optical Waveguide and Electronic Circuit," Oki Technical Review; Issue 216, vol. 77, No. 1; 5 pages (Apr. 2010).

\* cited by examiner

DUAL COLLIMATING LENS CONFIGURATION FOR OPTICAL DEVICES

CROSS-REFERENCE TO RELATED APPLICATION

This application is a national stage application under 35 U.S.C. § 371 of PCT International Application Serial No. PCT/US2017/053857, filed on Sep. 28, 2017 and entitled "DUAL COLLIMATING LENS CONFIGURATION FOR OPTICAL DEVICES," which is hereby incorporated by reference herein in its entirety.

TECHNICAL FIELD

This disclosure pertains to a dual collimating lens configuration for optical devices.

BACKGROUND

Fiber optics and photonics have increased the bandwidth and speeds available for communications systems, computing, networking, and other electronics systems. Optical systems used for photonics applications can use optical multiplexers and demultiplexers for multi-channel applications. On the reception end, a demultiplexer can receive light from an optical fiber and separate the received light into multiple channels, and direct the light into a photo-sensitive element.

BRIEF SUMMARY OF THE INVENTION

This disclosure describes an optical device, such as a reception device, that uses a dual collimator lens configuration to collimate light beams between an optical demultiplexer and a photodetector. In previous optical devices, a distance between an optical demultiplexer and photodetector is determined by an epoxy thickness, which is difficult to control. The structures and techniques described herein make the epoxy bond line thickness less critical. This disclosure also describes structures and techniques that enlarge the assembly window for horizontal alignment, such that the corresponding assembly yield can significantly increase while maintaining coupling efficiency between the optical demultiplexer and the photodetector.

BRIEF DESCRIPTION OF THE DRAWINGS

Figures may not be drawn to scale.

DETAILED DESCRIPTION

Described herein are dual collimating lens configurations for optical devices. In the following description, various aspects of the illustrative implementations will be described using terms commonly employed by those skilled in the art to convey the substance of their work to others skilled in the art. However, it will be apparent to those skilled in the art that the present disclosure may be practiced with some of the described aspects. For purposes of explanation, specific numbers, materials and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. By contrast, a first layer "on" a second layer is in direct contact with that second layer. Similarly, unless explicitly stated otherwise, one feature disposed between two features may be in direct contact with the adjacent features or may have one or more intervening layers.

Photonic devices are components for creating, manipulating or detecting light. This can include laser diodes, light-emitting diodes, solar and photovoltaic cells, displays and optical amplifiers. Other examples are devices for modulating a beam of light and for combining and separating beams of light of different wavelength. In optical modules, the incoming fiber may be optically connected to a photodetector to convert laser light to input/output (IO) signals. Optical modules can include an optical demultiplexer. The optical demultiplexer can receive a light beam consisting of multiple optical frequencies and separate the light beam into multiple frequency components. The optical demultiplexer can then direct the multiple light beams to a photodetector. The alignment of the optical demultiplexer and photodetector relies on active alignment. The distance between optical demultiplexer and photodetector is controlled by the epoxy thickness which is used to attach the optical demultiplexer to the printed circuit board. The alignment and bond line thickness control is challenging because the coupling loss requirement is less than 1 db (~80% of coupling efficiency). (Bond line thickness refers to the thickness of the epoxy that is used to attach the optical demultiplexer to a printed circuit board.)

This disclosure describes an optical device, such as a reception device, that uses collimate light beams in between the optical demultiplexer and the photodetector to make the optical assembly easier. The structures and techniques described herein make the epoxy bond line thickness control (which controls the optical demultiplexer location) less critical. This disclosure also describes structures and techniques that enlarge the assembly window for horizontal alignment such that the corresponding assembly yield can significantly increase while maintaining coupling efficiency between the optical demultiplexer and the photodetector.

Figure 1:
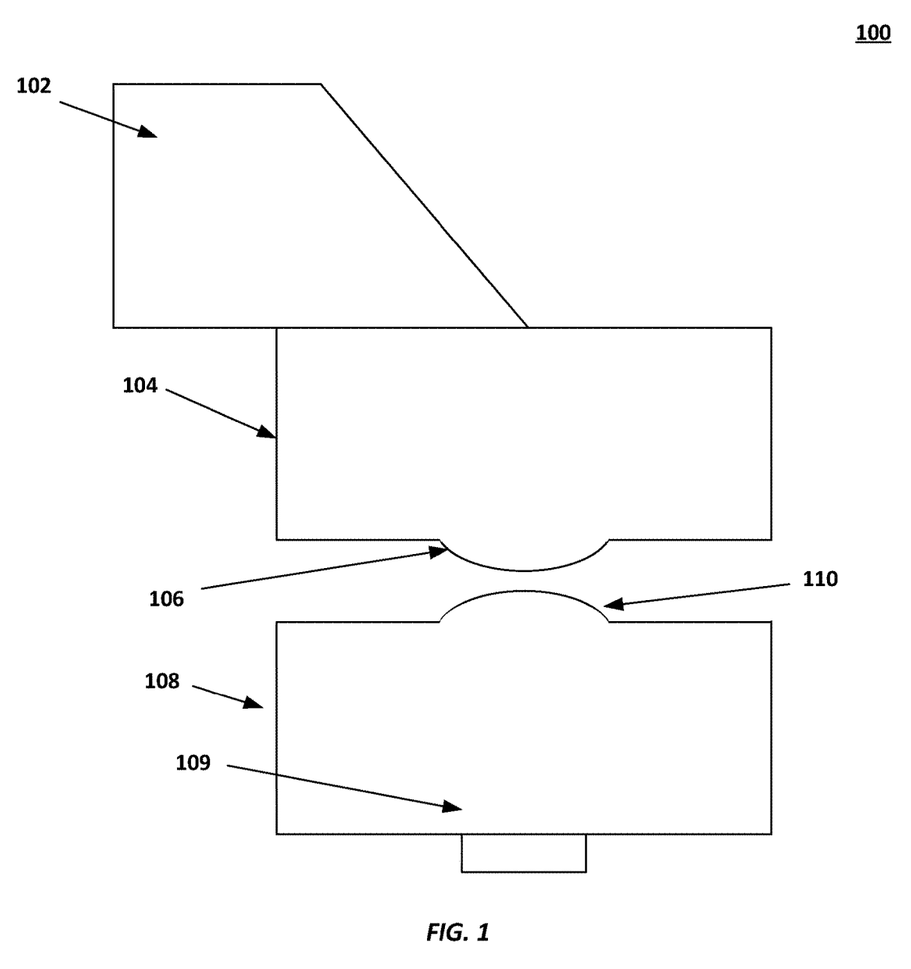
FIG. 1 is a schematic diagram of an optical demultiplexer and a photodetector that includes a dual collimator lens configuration in accordance with embodiments of the present disclosure.
Figure 4:
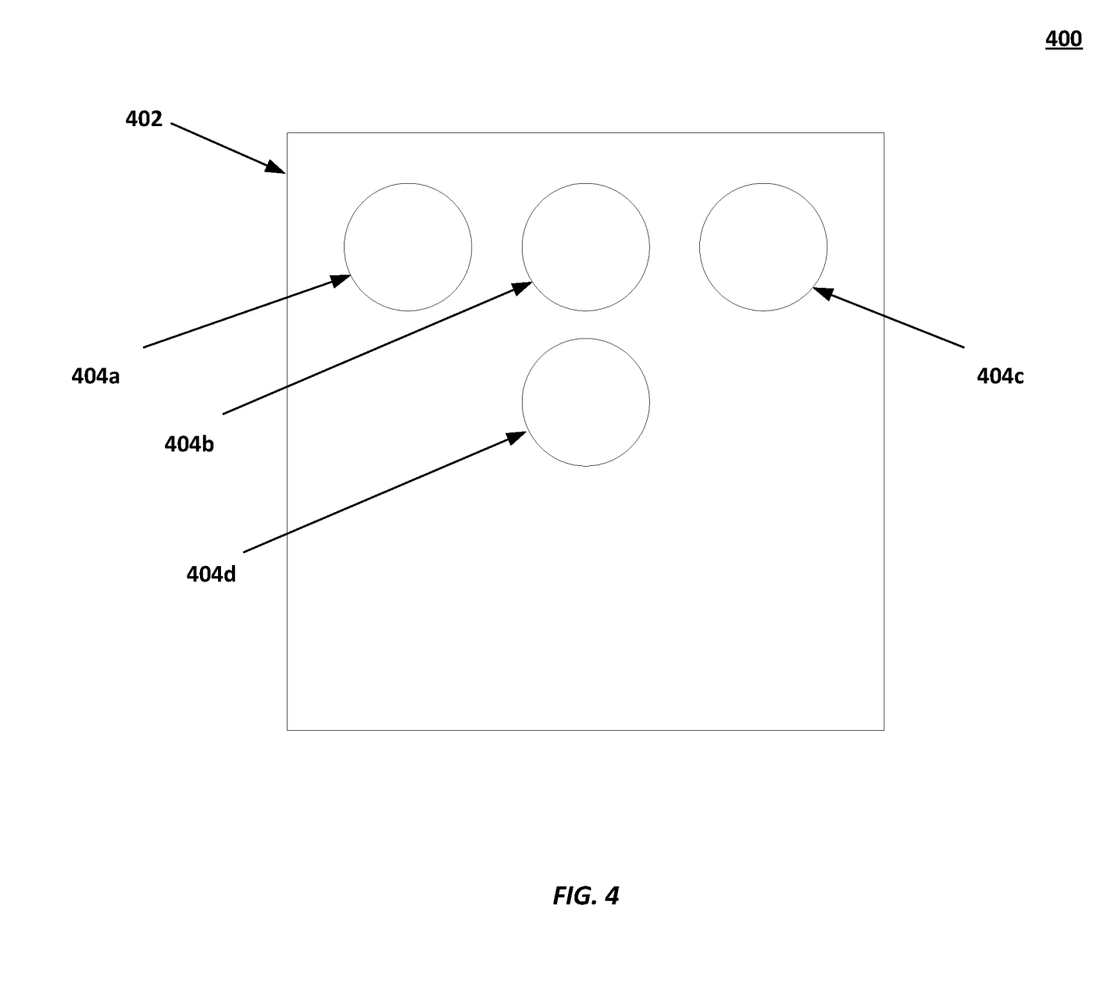
FIG. 4 is a schematic diagram of an optical component that includes multiple collimator lens in accordance with embodiments of the present disclosure.

FIG. 1 is a schematic diagram of a system 100 that includes an optical demultiplexer and a photodetector that includes a dual collimator lens configuration in accordance with embodiments of the present disclosure. The system 100 can be part of an optics module, such as those used for optical communications. The system 100 shown in FIG. 1 includes an optical demultiplexer 102, a quartz block 104, and a demultiplexer (demux) collimator lens 106 (shown as a single lens, though as shown in FIG. 4, multiple collimator lenses can be used).

The quartz block 104 can be used as a dispersal element from the point source of light from the optical demultiplexer 102. The quartz block 104 can be affixed to the optical demultiplexer 102 by an optically transparent epoxy or by other ways. The quartz block 104 includes one or more collimating lenses 106. The quartz block 104 can be molded to include the collimating lens 106. In embodiments, the collimating lens 106 can be affixed to the quartz block 104 using an optically transparent epoxy.

In some embodiments, the quartz block 104 can include a collimating element 112. Collimating element 112 can help to collimate light emitted from the demultiplexer into the collimating lens 106. The collimating element 112 can be integrated into the quartz block during the manufacturing of the quartz block 104 such as through a molding processes or semiconductor process.

The system 100 also includes a photodetector (PD) 108 that includes a PD focusing lens 110. Photodetector 108 can be a fast photodiode configured for communications applications. The photodetector 108 can include a photosensitive element 109 for receiving light and converting the received light into electrical signals. The PD focusing lens 110 can be attached to the photodetector 108 by an optically transparent epoxy. In embodiments, the photodetector 108 can be molded to include the PD focusing lens 110.

In some embodiments, the photodetector 108 also includes a focusing element 114. Focusing element 114 can further focus and direct light towards the photosensitive element 109. The focusing element 114 can be integrated into the photodetector during the manufacturing of the photodetector 108, such as through a molding processes or semiconductor process.

Figure 2A:
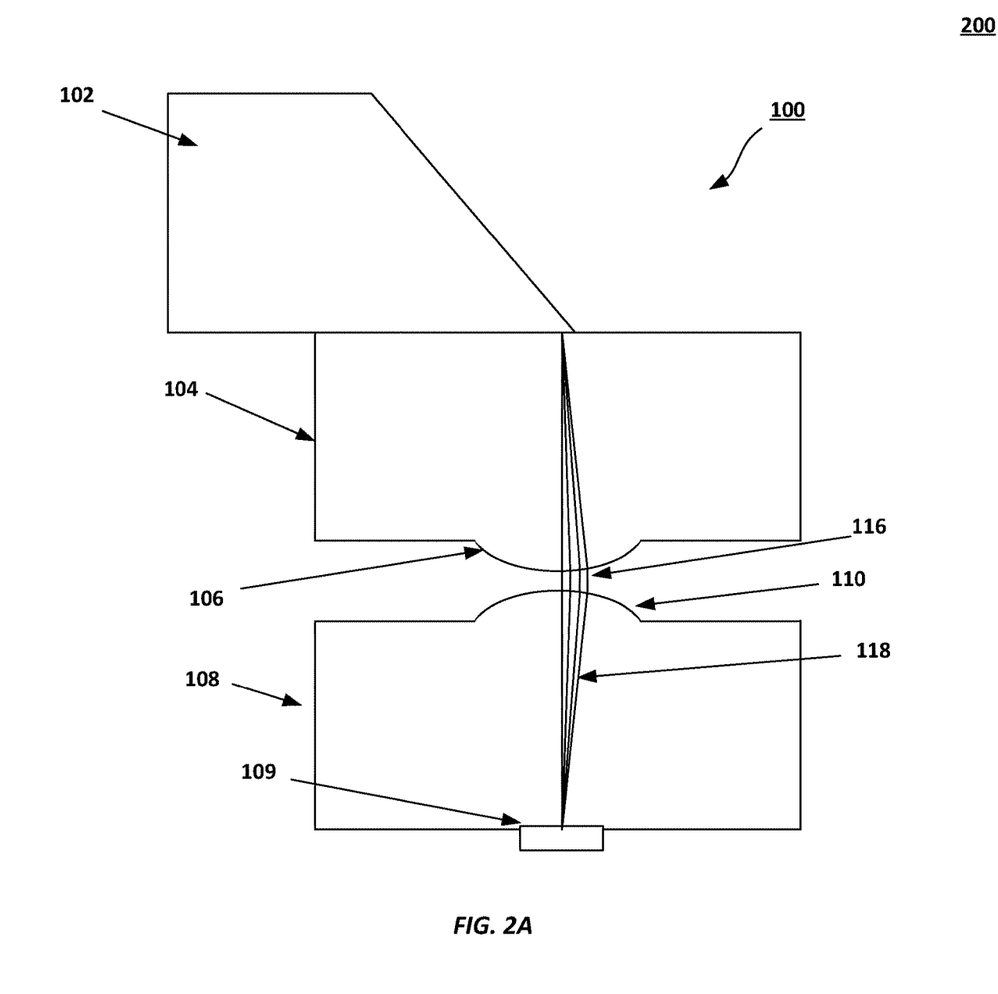
FIG. 2A is a schematic diagram of a demultiplexer optical component and a photodetector that includes a dual collimator lens configuration illustrating light collimation in accordance with embodiments of the present disclosure.

FIG. 2A is a schematic diagram 200 of an optical demultiplexer 102 and a photodetector 108 that includes a dual collimator lens configuration illustrating collimating light 116 in accordance with embodiments of the present disclosure. The optical demultiplexer 102 can be coupled to an optical fiber (not shown) that directs light into the optical demultiplexer 102. The optical demultiplexer can direct light through the quartz block 104 and the demux collimating lens 106 (and in some embodiments, through the collimating element 112). As mentioned above, the system 100 includes at least two lenses: a demux collimating lens 106 and a PD focusing lens 110. The lenses 106 and 110 can be made of silicon or other optically equivalent material.

The curvature of the collimating lens 106 and focusing lens 110 are designed or selected so that the light 116 emitted from the demux collimating lens 106 and entering the PD focusing lens 110 is collimated or substantially collimated. The curvature of the lenses can be optimized by using commercial software. In embodiments, the lenses can be spherical lens. Spherical lenses are easier to make and are often used to produce approximately collimated light. For an example 400 G system, one example curvature radius for the demux collimating lens 106 is 420 µm; one example curvature radius for the PD focusing lens 110 is 580 µm. It is understood that radii of curvature of the lenses mentioned above are by example only, and can be different for different designs of the optical components.

Figure 2B:
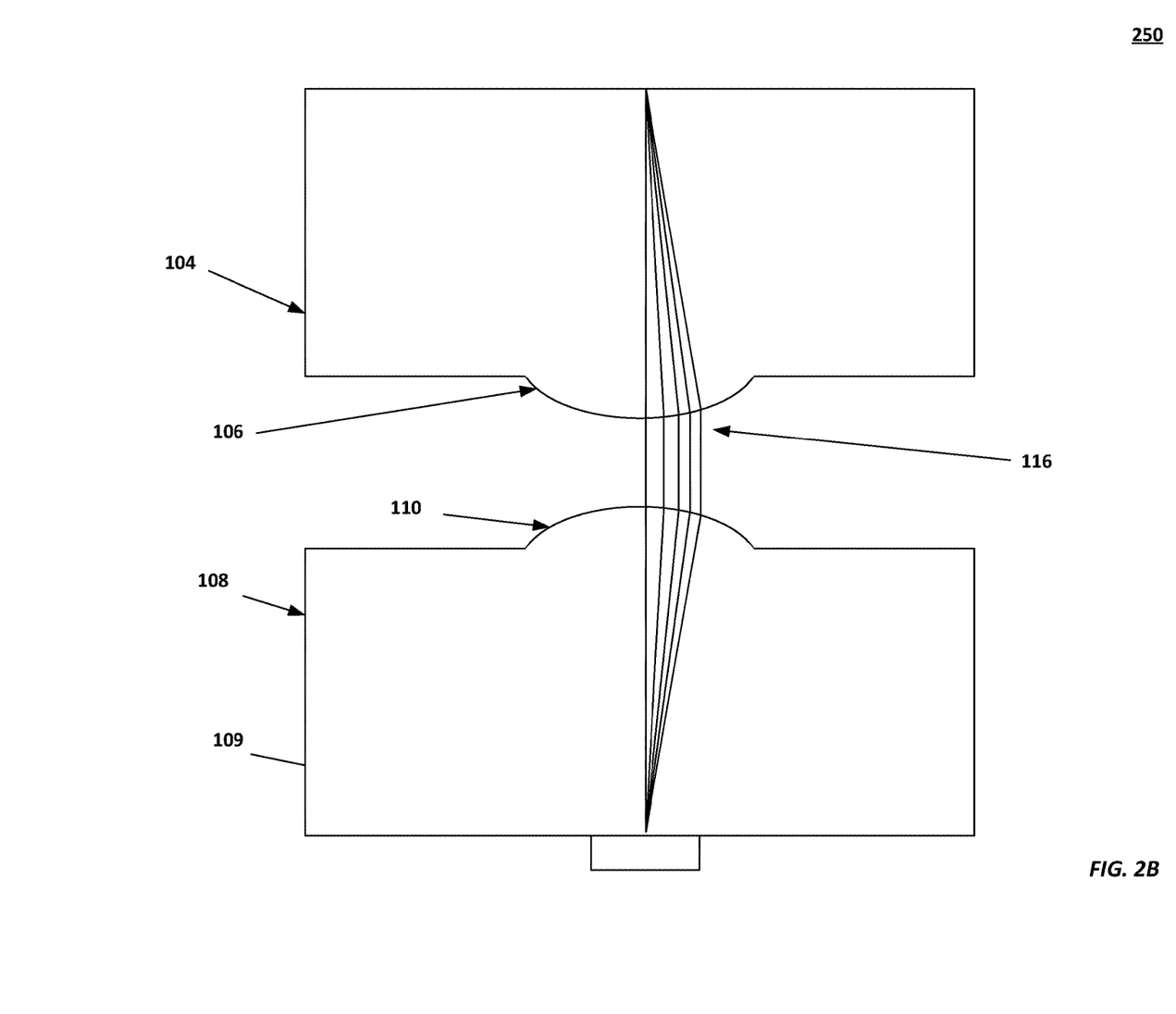
FIG. 2B is a schematic diagram of a close-up view of a dual collimator lens configuration illustrating light collimation in accordance with embodiments of the present disclosure.

FIG. 2B is a schematic diagram 250 of a close-up view of a dual collimator lens configuration illustrating collimate light 116 in accordance with embodiments of the present disclosure. In FIG. 2B, the distance between the demux collimating lens 106 and the PD focusing lens 110 is exaggerated to illustrate that the light 116 is collimated (or substantially collimated) as the light 116 exits the demux collimating lens 106 and enters the PD focusing lens 110. Since the light is collimated in between the lenses, coupling efficiency can be maintained even in view of vertical distances between the lenses that may occur during assembly of the system 100. The horizontal alignment between the optical demultiplexer and the photodetector 108 will also become easier because the incoming light to the PD focusing lens 110 will merge to the photosensitive element 109.

Figure 3A:
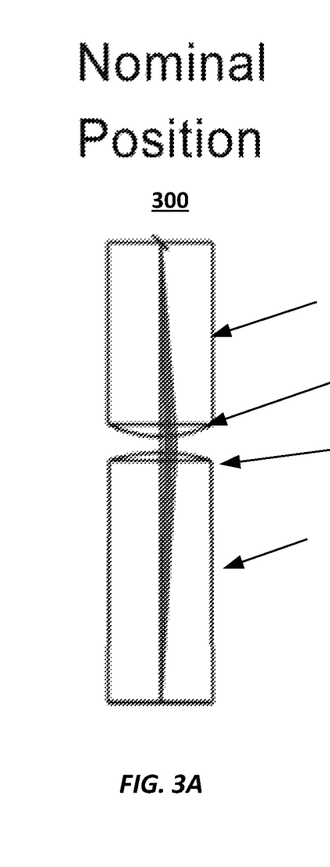
FIG. 3A-3C are schematic diagrams illustrating light collimation at different positions of a dual collimator lens configuration in accordance with embodiments of the present disclosure.
Figure 3B:
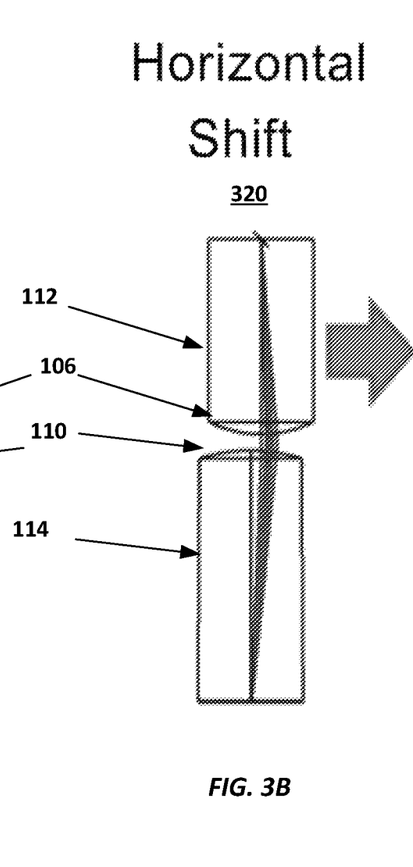
Figure 3C:
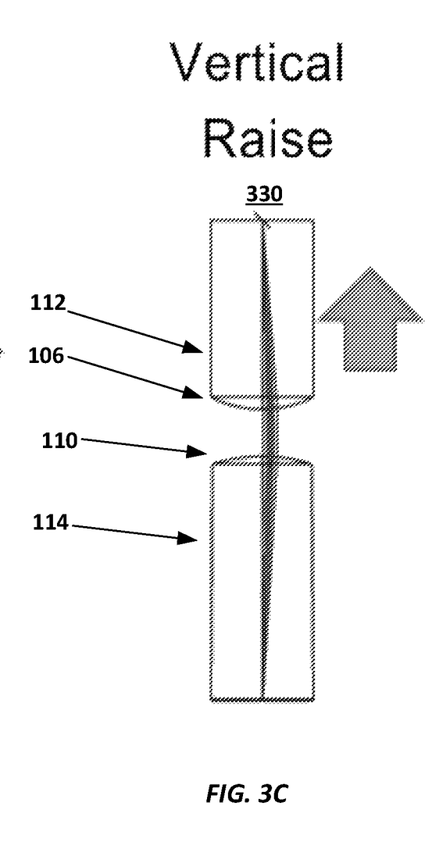

FIG. 3A-3C are schematic diagrams illustrating light collimation at different positions of a dual collimator lens configuration in accordance with embodiments of the present disclosure. In FIG. 3A, a "nominal" position 300 of the demux collimating lens 106 and the PD focusing lens 110 is shown. Nominal positioning here implies that a coupling efficiency above a threshold value is achieved (e.g., a threshold value of ~80% coupling efficiency or higher). In FIG. 3B, a horizontally shift 320 is illustrated between the demux collimating lens 106 and the PD focusing lens 110. A horizontal shift can have the biggest impact on coupling efficiency. For example, a single lens configuration can lose nominal coupling efficiency with a horizontal offset of less than 15 µm. The horizontal offset can increase above 25 µm in a dual lens system while maintaining nominal coupling efficiency. In FIG. 3C, a vertical shift 330 is illustrated between the demux collimating lens 106 and the PD focusing lens 110. The dual lens configuration facilitates nominal coupling efficiency even in view of large vertical offsets (e.g., greater than 60 µm vertical offset).

The dual collimating lens configuration of the present disclosure broadens the optical assembly window by 3× in length of any direction and by 7× in area.

FIG. 4 is a schematic diagram 400 of an optical component 402 that includes multiple collimator lens 404a-d in accordance with embodiments of the present disclosure. In FIG. 4, the optical component 402 can be a quartz block or a photodetector. In some embodiments, the optical system can handling multiple channels or optical frequencies. The number of lenses can be selected based on the number of channels the system is designed to handle. In FIG. 4, four lenses 404a-d are shown as part of a four channel system.

The lenses 404a-d can be demux collimating lenses or PD focusing lenses, depending on what the optical component 402 is.

Figure 5:
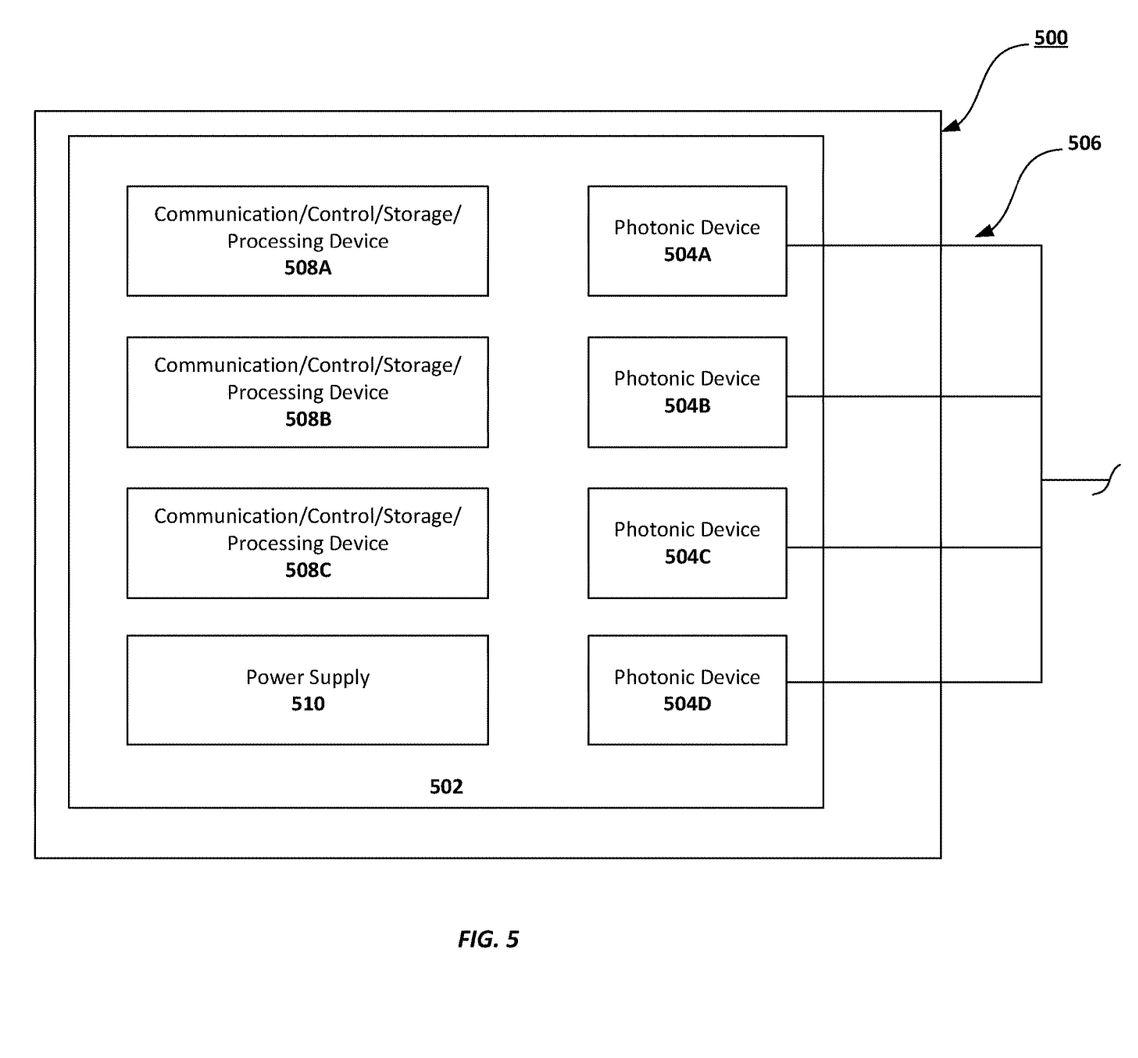
FIG. 5 is a schematic diagram of an electronic system that includes a photonic device having a dual collimator lens configuration in accordance with embodiments of the present disclosure.
Figure 6A:
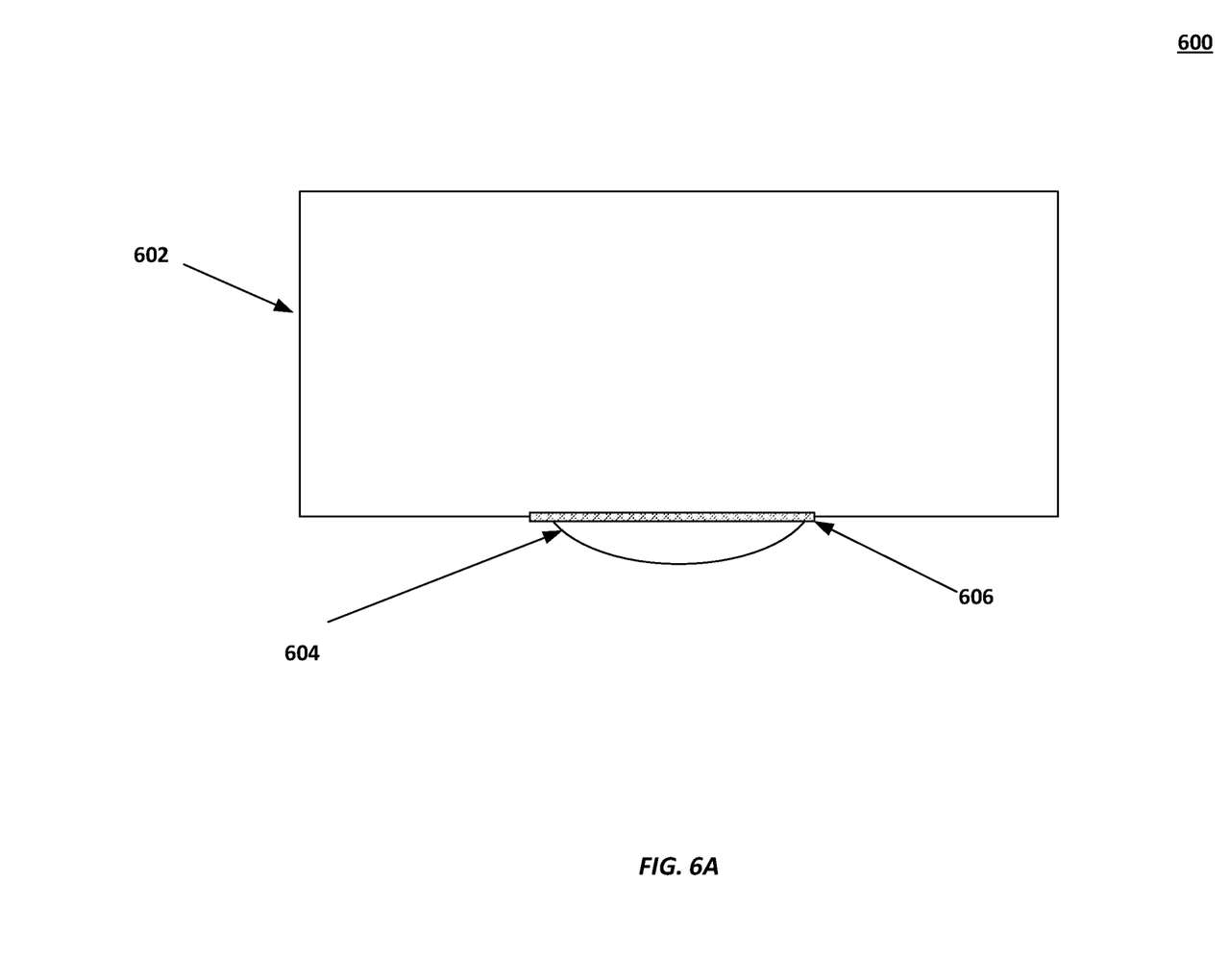
FIG. 6A is a schematic diagram of a collimator lens configuration in accordance with embodiments of the present disclosure.
Figure 6B:
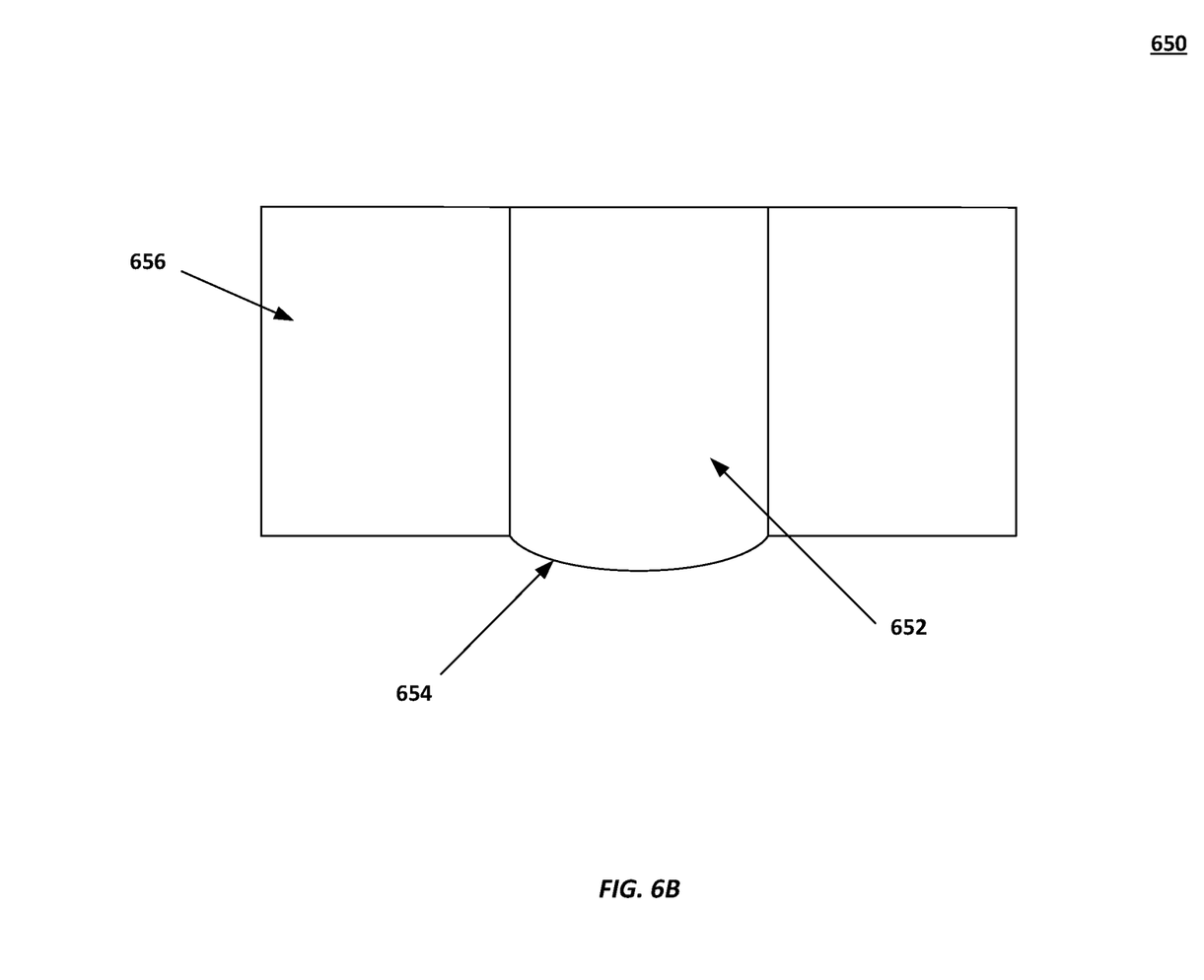
FIG. 6B is a schematic diagram of another collimator lens configuration in accordance with embodiments of the present disclosure.

FIG. 5 is a schematic diagram of an electronic system 500 that includes a photonic device having a dual collimator lens configuration in accordance with embodiments of the present disclosure. The electronic system 500 may include a motherboard 502. The motherboard 502 may include a number of photonic devices (shown generically as photonic device 504A, 504B, 504C, and 504D). The motherboard 502 may further include a number of components, including but not limited to a communication devices, control devices, storage devices, and processing devices (shown generically as communication/control/storage/processing device 508A, 508B, and 508C) and an onboard power supply 210 electrically coupled to the motherboard 502. In some implementations of the present description, at least one of the communication/control/storage/processing devices 508A, 508B, and 508C may be electrically coupled to at least one other of the communication/control/storage/processing devices 508A, 508B, and 508C and/or at least one of the photonic devices 504A, 504B, 504C, 504D through the motherboard 502. As further illustrated in FIG. 5, optical cabling (e.g., fiber optic cabling) 506 may be in photonic communication with the photonic devices 504A, 504B, 504C, 504D for communication with external devices (not shown). At least one of the photonic devices 504A, 504B, 504C, 504D may incorporate the dual collimating lens configuration illustrated in FIGS. 1 and 2A-B.

It is understood that the subject matter of the present description is not necessarily limited to specific applications illustrated in FIGS. 1-5. The subject matter may be applied to other microelectronic device and assembly applications, as well as any appropriate heat removal application, as will be understood to those skilled in the art.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims.

The relative sizes of features shown in the figures are not drawn to scale.

The following paragraphs provide examples of various ones of the embodiments disclosed herein.

Example 1 is 1 an optical system that includes an optical demultiplexer (demux); a collimating lens optically coupled to the optical demux; a photodetector (PD); and a focusing lens optically coupled to the PD.

Example 2 may include the subject matter of example 1, and also may include an optical diffusion element coupled to the optical demux, wherein the collimating lens is physically coupled to the optical diffusion element.

Example 3 may include the subject matter of any of examples 1 or 2, and may also include an optically transparent epoxy, wherein the collimating lens is coupled to the optical diffusion element by the optically transparent epoxy.

Example 4 may include the subject matter of any of examples 1 or 2 or 3, wherein the collimating lens and the optical diffusion element are a single molded component.

Example 5 may include the subject matter of any of examples 1 or 2 or 3 or 4, wherein the optical diffusion element comprises a quartz block.

Example 6 may include the subject matter of any of examples 1 or 2 or 3 or 4 or 5, and may also include a collimating element optically coupled to the optical demux and the collimating lens.

Example 7 may include the subject matter of example 6, wherein the collimating element is integrated into the optical diffusion element.

Example 8 may include the subject matter of any of examples 1-7, wherein the PD comprises a photosensitive element configured to receive light from the focusing lens.

Example 9 may include the subject matter of example 1-8, wherein the optical demux comprises a plurality of collimating lenses; and the photodetector comprises a plurality of focusing lenses, the number of collimating lenses equal to the number of focusing lenses.

Example 10 may include the subject matter of any of examples 1-9, wherein the PD comprises a focusing element integrated into the PD.

Example 11 may include the subject matter of any of examples 1-10, wherein one or both of the demux collimating lens or the PD lens comprises silicon.

Example 12 may include the subject matter of any of examples 1-11, wherein a coupling efficiency between the optical demux and the photodetector is above 79%.

Example 13 may include the subject matter of any of examples 1-12, wherein the optical demux is offset horizontally from the photodetector by a distance within the range of 25-35 microns.

Example 14 may include the subject matter of any of examples 1, wherein the optical demux is offset vertically from the photodetector by a distance within the range of 40-100 microns.

Example 15 is an electronic device that includes a processing device; and a photonic device. The photonic device includes an optical demultiplexer; a collimating lens optically coupled to the optical demultiplexer and positioned to receive light from the optical demultiplexer, the collimating lens configured to collimate light received from the optical demultiplexer; a photodetector comprising a photosensitive element, the photosensitive element configured to convert received light into an electrical signal; and a focusing lens optically coupled to the photodetector, the focusing lens configured to receive light and focus the light towards the photosensitive element.

Example 16 may include the subject matter of example 15, wherein the optical demultiplexer is optically coupled to a fiber optic cable, the fiber optic cable configured to direct light into the optical demultiplexer.

Example 17 may include the subject matter of any of examples 15-16, and may also include an optical diffusion element coupled to the optical demux, wherein the collimating lens is physically coupled to the optical diffusion element.

Example 18 may include the subject matter of example 17, further comprising a collimating element optically coupled to the optical demux and the collimating lens.

Example 19 may include the subject matter of any of examples 15-18, wherein a coupling efficiency between the optical demux and the photodetector is above 79%.

Example 20 may include the subject matter of any of examples 15-19, wherein the optical demux is offset horizontally from the photodetector by a distance within the range of 25-35 microns.

Example 21 may include the subject matter of any of examples 15-20, wherein the optical demux is offset vertically from the photodetector by a distance within the range of 40-100 microns.

Example 22 is a method that includes directing light from an optical demultiplexer to a collimating lens; directing collimated light from the collimating lens to a focusing lens; and detecting the focused light on a photodetector.

Example 23 may include the subject matter of example 22, and may also include receiving light into the optical demultiplexer from a fiber optic cable; separating the received light into multiple channels; directing each channel of light to a collimating lens; collimating each channel of light; directing each channel of collimated light to a corresponding focusing lens; and focusing each channel of collimated light; and directing each channel of focused light into a corresponding photosensor.

Example 24 may include the subject matter of example 22, wherein directing light from the optical demultiplexer to the collimating lens comprises directing light from the demultiplexer into a diffusive optical element coupled to an output of the optical demultiplexer, the diffusive optical element coupled to the collimating lens.

Example 25 may include the subject matter of any of examples 22 or 24, wherein directing light from the optical demultiplexer to the collimating lens comprises directing light from the optical demultiplexer to a collimating optical element optically coupled to the collimating lens.

Example 26 is an electronic device that includes a processing device; and a photonic device. The photonic device can include an optical demultiplexer; a means for collimating light received from the optical demultiplexer, the means for collimating light configured to collimate light received from the optical demultiplexer; a photodetector comprising a photosensitive element, the photosensitive element configured to convert received light into an electrical signal; and a means for focusing light received from the means for collimating light towards the photosensitive element.

Example 27 may include the subject matter of example 22, wherein the electronic device is a component of a 400 G data communications system.

Example 28 may include the subject matter of example 1, wherein the optical system is part of a data transmission receiver.

Example 29 may include the subject matter of any of examples 1 or 28, wherein the optical system is part of a 400 gigabyte-capable data transceiver.

Example 30 may include the subject matter of example 1, wherein the optical demultiplexer is configured to receive light from a fiber optic cable.

The invention claimed is:

1. An optical system comprising:
   an optical demultiplexer;
   a collimating lens optically coupled to the optical demultiplexer;
   a photodetector; and
   a focusing lens optically coupled to the photodetector, wherein a distance between the optical demultiplexer and the photodetector is between 40 microns and 100 microns.

2. The optical system of claim 1, further comprising an optical diffusion element coupled to the optical demultiplexer, wherein the collimating lens is physically coupled to the optical diffusion element.

3. The optical system of claim 2, further comprising an optically transparent epoxy, wherein the collimating lens is coupled to the optical diffusion element by the optically transparent epoxy.

4. The optical system of claim 2, wherein the collimating lens and the optical diffusion element are a single molded component.

5. The optical system of claim 2, further comprising a collimating element optically coupled to the optical demultiplexer and the collimating lens.

6. The optical system of claim 1, wherein the photodetector comprises a photosensitive element to receive light from the focusing lens.

7. The optical system of claim 1, wherein the optical demultiplexer comprises a number of collimating lenses, the photodetector comprises a number of focusing lenses, and the number of collimating lenses is equal to the number of focusing lenses.

8. The optical system of claim 1, wherein the photodetector comprises a focusing element.

9. The optical system of claim 1, wherein the optical demultiplexer is offset horizontally from the photodetector by a second distance between 25 microns and 35 microns.

10. The optical system of claim 1, wherein the optical system is part of a data transmission receiver.

11. The optical system of claim 1, wherein the optical demultiplexer is configured to receive light from a fiber optic cable.

12. An electronic device comprising:
    a processing device; and
    a photonic device comprising:
      an optical demultiplexer;
      a collimating lens optically coupled to the optical demultiplexer and positioned to receive light from the optical demultiplexer, the collimating lens to collimate light received from the optical demultiplexer;
      a photodetector comprising a photosensitive element, the photosensitive element to convert received light into an electrical signal, wherein a distance between the optical demultiplexer and the photodetector is between 40 microns and 100 microns; and
      a focusing lens optically coupled to the photodetector, the focusing lens to receive light and focus the light towards the photosensitive element.

13. The electronic device of claim 12, wherein the optical demultiplexer is optically coupled to a fiber optic cable, the fiber optic cable to direct light into the optical demultiplexer.

14. The electronic device of claim 12, further comprising an optical diffusion element coupled to the optical demultiplexer, wherein the collimating lens is physically coupled to the optical diffusion element.

15. The electronic device of claim 14, further comprising a collimating element optically coupled to the optical demultiplexer and the collimating lens.

16. A method comprising:
    directing light from an optical demultiplexer to a collimating lens to generate collimated light;
    directing the collimated light to a focusing lens to generate focused light; and
    detecting the focused light on a photodetector, wherein a distance between the optical demultiplexer and the photodetector is between 40 microns and 100 microns.

17. The method of claim 16, further comprising:
    receiving light into the optical demultiplexer from a fiber optic cable;

separating the received light into multiple channels;
directing each channel of light to a corresponding collimating lens;
collimating each channel of light;
directing each channel of collimated light to a corresponding focusing lens; and
focusing each channel of collimated light; and
directing each channel of focused light into a corresponding photosensor.

18. The method of claim 16, wherein directing light from the optical demultiplexer to the collimating lens comprises directing light from the optical demultiplexer into a diffusive optical element coupled to an output of the optical demultiplexer, and the diffusive optical element is coupled to the collimating lens.

19. The method of claim 16, wherein directing light from the optical demultiplexer to the collimating lens comprises directing light from the optical demultiplexer to a collimating optical element optically coupled to the collimating lens.

* * * * *